United States Patent [19]
Komine

[11] Patent Number: 5,500,520
[45] Date of Patent: Mar. 19, 1996

[54] COMPACT LARGE APERTURE OPTICAL TRANSMITTER/RECEIVER FOR LIDARS EMPLOYING A PLURALITY OF CASSEGRAIN OPTICS AND OPTICAL FIBERS

[75] Inventor: Hiroshi Komine, Torrance, Calif.

[73] Assignee: Northrop Grumman Corporation, Los Angeles, Calif.

[21] Appl. No.: 306,799

[22] Filed: Sep. 15, 1994

[51] Int. Cl.⁶ .................................................. G01C 21/02
[52] U.S. Cl. .................................. 250/203.1; 250/203.2
[58] Field of Search .............................. 250/203.1, 203.2, 250/349, 353; 359/859, 850; 385/31, 115

[56] References Cited

U.S. PATENT DOCUMENTS

| | | | |
|---|---|---|---|
| 3,524,180 | 8/1970 | Cruse | 250/349 |
| 4,054,364 | 10/1977 | Webster. | |
| 4,227,077 | 10/1980 | Hopson et al. | 250/203.1 |
| 4,282,527 | 8/1981 | Winderman et al. | 343/725 |
| 4,297,000 | 10/1981 | Fries | 385/115 |
| 4,384,198 | 5/1983 | Williamson | 250/203.1 |
| 4,511,755 | 4/1985 | Mori | 385/115 |
| 4,792,685 | 12/1988 | Yamakawa | 250/353 |

Primary Examiner—Edward P. Westin
Assistant Examiner—Steven L. Nichols
Attorney, Agent, or Firm—Terry J. Anderson; Karl J. Hoch, Jr.

[57] ABSTRACT

A plurality of light concentrators (12) each provide light over an optical fiber cable (23) to a single optical detector (25) in a non-imaging laser radar. Each light detector may comprise a single mirror (29) or a primary mirror (20) and secondary mirror (22). A transmitter (13) within the array may comprise the same configuration as the light concentrators (12) to deliver laser light from fiber optic cables (23, 30) or may comprise a primary mirror (35) with a large hole (38) that delivers laser light to a secondary mirror (37). The array provides a very rugged large aperture which is very short, and which can be increased without any increase in length.

6 Claims, 2 Drawing Sheets

COMPACT LARGE APERTURE OPTICAL TRANSMITTER/RECEIVER FOR LIDARS EMPLOYING A PLURALITY OF CASSEGRAIN OPTICS AND OPTICAL FIBERS

TECHNICAL FIELD

This invention relates to a segmented optical transmitter/receiver for use in Light Detection and Ranging (LIDAR) systems, which are also known as laser radars or LADARS.

BACKGROUND ART

Conventional laser radar systems employ laser transmitters and optical receivers that collect back scattered light from targets illuminated by the laser beam. The back scattered light may be generated by Mie scattering or fluorescence from the target material, such as dust particles, molecular gases, and solid objects. Because the back scattered light intensity is typically many orders of magnitude weaker than the transmitted light intensity, it is customary to use a telescope with a large receiving aperture to detect the return signal with sufficient signal to noise ratio. Known large apertured telescopes utilized in laser radars typically comprise a single unit, which may be a single large mirror, or a set of reflectors such as a Cassegrain system. Telescopes of this type share many of the optical and mechanical characteristics of astronomical telescopes. They are very large, with substantial mass, and occupying large volumes. This makes them difficult to move rapidly, and therefore renders them useless on a scan platform. Telescopes of this type are also cumbersome, and subject to optical misalignment as a result of mechanical shock and vibration. Therefore, such telescopes are not well suited for mobile use, which comprises a large fraction of the applications for laser radar. Some examples of this type are illustrated in U.S. Pat. Nos. 4,054,364, 4,282,527, and 4,792,685.

DISCLOSURE OF INVENTION

Objects of the invention include provision of a large-aperture optical transmitter/receiver system which is compact, capable of being implemented with very light weight, rugged, and able to withstand vibration and shock inherent in mobile applications without problems of fatigue, optical misalignment, and so forth.

This invention is predicated in part on the observation that many laser radar applications do not require an image of the target, but only that light reflected from the target be collected efficiently. Thus, the large-aperture receiver of the present invention may comprise a non-imaging optical system.

According to the present invention, an array of small light concentrators are integrated together into a single compact mechanical structure, each concentrator focusing collected light into a fiber optical cable, the aggregation of light delivered by cables of all of the concentrators is provided to a single light detector. According to the invention, each concentrator may comprise only a single convex primary mirror, for greater optical efficiency, or may include a secondary mirror in a Cassegrain configuration, to achieve compactness and low weight. In accordance further with the invention, the concentrators may be interconnected in a honeycomb fashion which provides parallel optical axes and a sturdy, integral structure which can resist vibration and stress. According further to the invention, an optical transmitter is disposed at the center of the array of light collectors; the transmitter may be of the same or different configuration from that of the light collectors.

A system of the present invention has a very large aperture, but is very short compared to single light collectors of the prior art. It therefore has substantially less mass, volume and moment of inertia than conventional large-aperture laser radar telescopes. It is well suited to being mounted directly on a scanning platform, and for use in mobile environments. The invention can be provided in a wide variety of configurations, to suit various applications, at relatively low cost.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
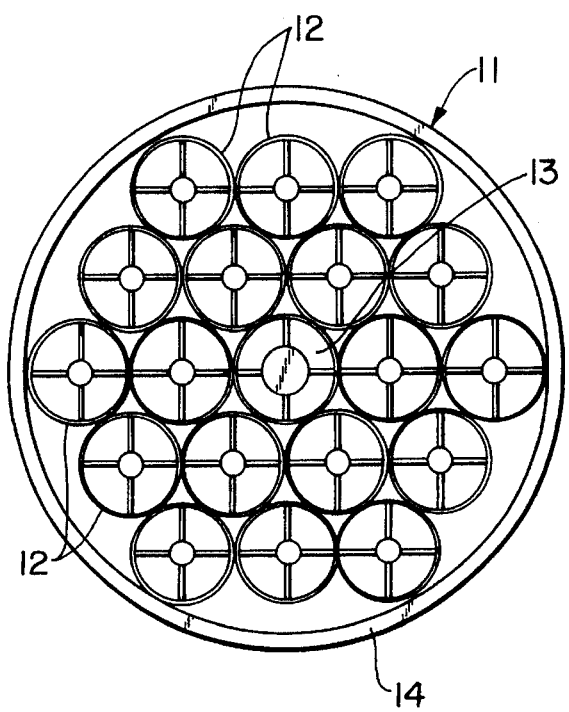
FIG. 1 is a front elevation view of an optical array in accordance with the present invention.

Referring now to FIGS. 1–4, an array 11 in accordance with the present invention comprises a plurality of light collectors 12 and transmitter optics 13 arranged in a honeycomb fashion within a cylindrical casing 14. The casing 14 may have any suitable back structure 15 and may be provided with a transparent front window 16, if desired. Each of the light concentrators 12 may consist of a cylindrical or tubular housing 19 which supports a primary mirror 20 and a plurality of struts 21 that support a secondary mirror 22. The primary mirror 20 and secondary mirror 22 may be round, as shown in FIGS. 1–4, or they can be made of other shapes, such as hexagonal or square, that can increase the fill factor of the receiver aperture. The aperture of each light collector is defined by the area between the housing 12 and the secondary mirror 22. Each light collector 12 has a fiber optic cable 23, which are bundled together into a trunk 24 for transmitting received light to a light detector 25. Thus, the detector 25 will respond to light collected by all of the light concentrators 12 in the array 11 to provide an electric signal on a line 26.

Figure 2:
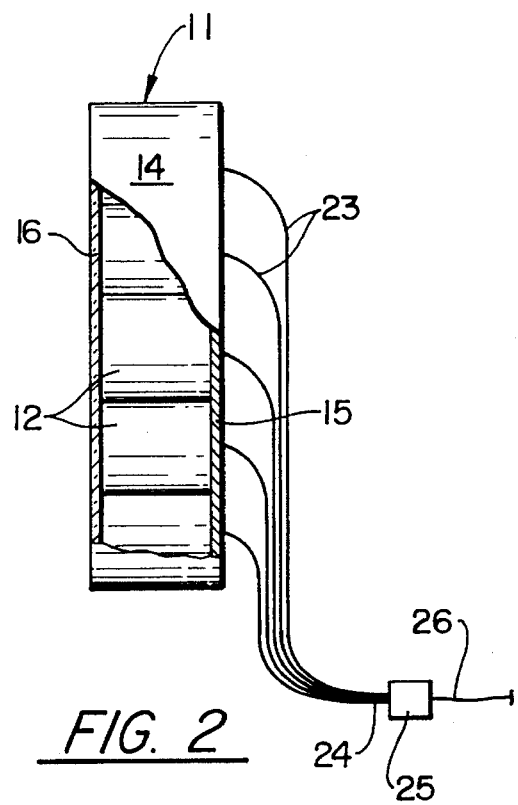
FIG. 2 is a side elevation view of the array of FIG. 1.
Figure 4:
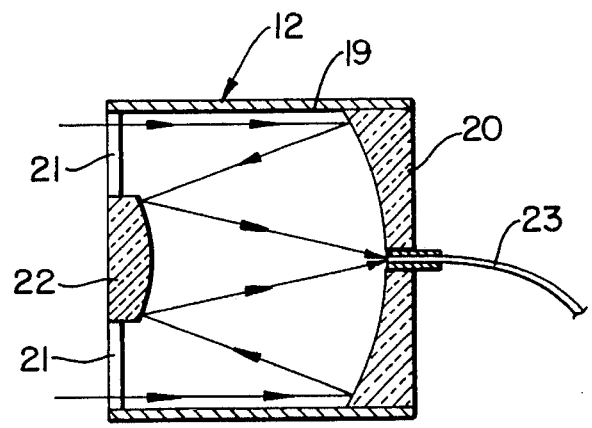
FIG. 4 is a sectioned, side elevation view taken on the line 4—4 of FIG. 2.

The array 11 may be built using modular manufacturing methods, in a variety of different ways. The mirrors may be electroformed; the honeycomb structure can simply comprise the casings 19 attached to each other, with six of the outer casings 19 also attached to the casing 14. The aperture of the array can be increased simply by adding another ring of light concentrators 12, without altering the light concentrators themselves. Thus, there is design flexibility inherent in the modular nature of the array 11. Additionally, since the aperture can be increased by adding more light concentrators 12, without increasing the length of each concentrator (as seen in FIGS. 2 and 4), two-dimensional aperture scaling results, in contrast with conventional telescopes in which the length must be increased as the aperture is enlarged. Each light concentrator 12 may be provided with high efficiency by selecting optimum size and curvature for the primary and secondary mirrors. This involves matching the focusing geometry of the light concentrator 12 to the numerical aperture and core size of the optical fiber cable 23. The numerical aperture of the fiber cable sets the maximum angle with which a ray from the secondary mirror can couple into the fiber, which in turn determines the maximum ratio of the size of the secondary mirror to the focal distance from the secondary mirror. The fiber optic cable diameter and the effective focal length determine the receiver angular field of view. These design considerations are generally known in the art.

Figures 5, 6:
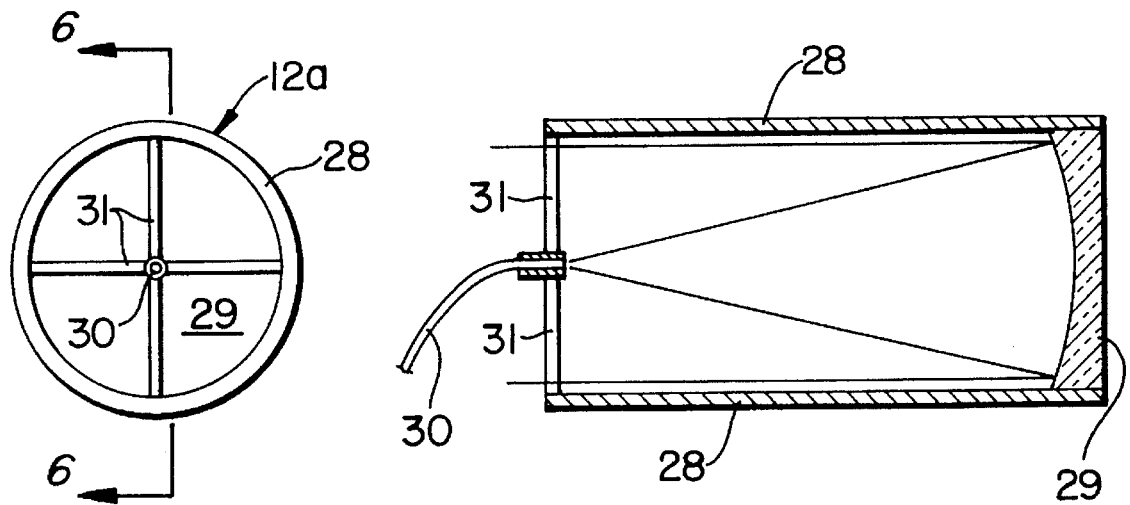
FIG. 5 is a front elevation view of an alternative light collector.
FIG. 6 is a sectioned side elevation view taken on the line 6—6 in FIG. 5.

Referring now to FIGS. 5 and 6, an alternative embodiment of an individual light concentrator 12a may consist of a cylindrical or tubular housing 28 having a single mirror 29 disposed therein to focus collected light directly onto one end of a fiber optic cable 30 which is supported by a plurality of struts 31. This increases the optical efficiency compared to the embodiment of FIGS. 3 and 4 because the fiber represents a much smaller obscuration area than does the secondary mirror 22 of FIGS. 3 and 4. Therefore, the optical throughput efficiency is greater in the embodiment of FIGS. 5 and 6. However, as is known, the length of the housing 28 is greater than the length required in the embodiment of FIGS. 3 and 4.

Figure 3:
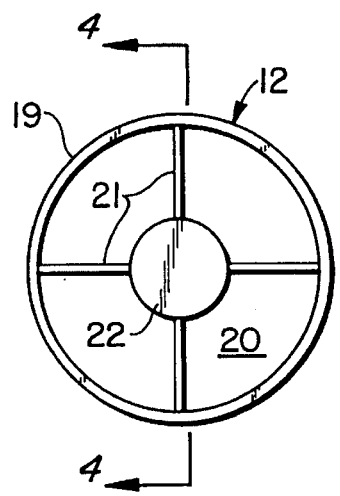
FIG. 3 is a front elevation view of one of the light collectors of FIG. 1, in further detail.

Thus, the embodiment of FIGS. 3 and 4 is better suited where compactness and low weight are of prime concern, but the embodiment of FIGS. 5 and 6 may be advantageous where superior optical efficiency is more important than size or weight.

The transmitter 13 may have the configuration of FIGS. 3 and 4, in which the light to be transmitted is delivered to the secondary mirror 22 by the fiber optic cable 23, and it is reflected from the primary mirror 20 outwardly to the left as seen in FIG. 4. On the other hand, the transmitter 13 could comprise the configuration of FIGS. 5 and 6 in which the light to be transmitted is delivered by the fiber optic cable 30 to the mirror 29 and reflected outwardly to the left as seen in FIG. 6.

Figure 7:
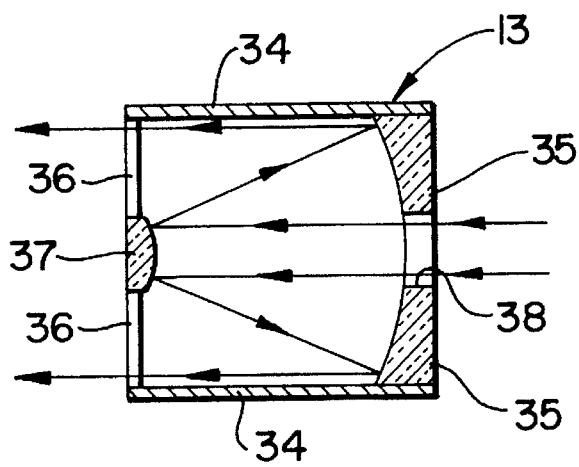
FIG. 7 is a sectioned side elevation view of an optical arrangement which may be used as an optical transmitter.

If the wave length of the transmitted light, or the peak or average power required cannot be transmitted effectively with optical fibers, a transmitter of the type illustrated in FIG. 7 may be used. Therein, a tubular or cylinder housing 34 supports a primary mirror 35 and a plurality of struts 36 that in turn support a secondary mirror 37. A large axial hole 38 in the primary mirror 35 allows a laser beam to pass through to the secondary mirror 37, for reflection to the primary mirror 35 which in turn reflects the light outwardly, to the left as seen in FIG. 7. Another embodiment may comprise a large bundle of optical fibers delivering the laser light through a hole similar to the hole 38.

The invention may be practiced utilizing a wide variety of known manufacturing techniques and known materials. The optical fiber cables are preferably bundles of optical fibers, but could consist of individual fibers. These and other details of the invention are irrelevant, since the invention comprises providing a large aperture receiver for a laser radar by creating an array of smaller aperture light concentrators, which individually feed the collected light over optical fiber cables to a single optical detector.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A compact large aperture optical transmitter/receiver system for illuminating and receiving light reflected from targets in a target area and providing an electric signal indicative thereof, comprising:

a plurality of light concentrators, each of said light concentrators having a fiber optic cable, a secondary mirror for reflecting and focusing light into the proximal end of said fiber optic cable and a primary mirror for reflecting light received by said light concentrator onto said secondary mirror;

an optical detector responsive to light appearing at the distal end of the fiber optic cable of all of said light concentrators and providing an electrical signal in response thereto; and transmitter optics separate from said light concentrators disposed in said array for transmitting light toward a target area from which light is to be reflected to said light concentrators.

2. A system according to claim 1 wherein said mirror reflects light received at said light concentrator directly onto said proximal end of said fiber optic cable.

3. A system according to claim 1 wherein said transmitter optics include a mirror and a fiber optic cable which provides light to said mirror for reflection toward said target area.

4. A system according to claim 3 wherein said transmitter optics comprise a primary mirror for reflecting light toward said target area, and a secondary mirror for reflecting light from said fiber optic cable to said primary mirror.

5. A system according to claim 3 wherein said mirror of said transmitter optics reflects light received from said fiber optic cable directly toward said target area.

6. A system according to claim 1 wherein said transmitter optics include a secondary mirror, a primary mirror having an axial hole through which light is directed to said secondary mirror for reflection to said primary mirror, and said primary mirror reflects said light toward said target area.

\* \* \* \* \*